United States Patent [19]

Iihoshi et al.

[11] Patent Number: 4,887,081
[45] Date of Patent: Dec. 12, 1989

[54] APPARATUS FOR DISPLAYING TRAVEL PATH

[75] Inventors: Akira Iihoshi; Yukinobu Nakamura; Shinichiro Yasui, all of Saitama, Japan

[73] Assignee: Honda Giken Kogyo Kabushiki Kaisha, Tokyo, Japan

[21] Appl. No.: 130,415

[22] Filed: Dec. 9, 1987

[30] Foreign Application Priority Data

Dec. 15, 1986 [JP] Japan .................. 61-298356

[51] Int. Cl.$^4$ .............................................. G08G 1/12
[52] U.S. Cl. ..................................... 340/995; 33/356; 73/178 R; 340/988; 364/449
[58] Field of Search ..................... 340/988, 990, 995; 73/178 R, 505; 364/449, 424, 460, 521; 33/356

[56] References Cited

U.S. PATENT DOCUMENTS

| | | | |
|---|---|---|---|
| 4,470,124 | 9/1984 | Tagami et al. | 340/995 |
| 4,494,116 | 1/1985 | Tagami et al. | 340/995 |
| 4,517,565 | 5/1985 | Nakamura et al. | 340/995 |
| 4,521,777 | 6/1985 | Nakamura et al. | 340/995 |
| 4,524,357 | 6/1985 | Nakamura et al. | 340/995 |
| 4,531,123 | 7/1985 | Tagami et al. | 340/995 |
| 4,535,334 | 8/1985 | Tagami et al. | 340/995 |
| 4,677,562 | 6/1987 | Uota et al. | 340/995 |
| 4,679,147 | 7/1987 | Tsujii et al. | 340/995 |
| 4,734,863 | 3/1988 | Honey et al. | 340/988 |
| 4,757,455 | 7/1988 | Tsunoda et al. | 340/995 |

FOREIGN PATENT DOCUMENTS 0215917 9/1986 Japan .................. 340/995

Primary Examiner—Joseph A. Orsino
Assistant Examiner—Brent A. Swarthout
Attorney, Agent, or Firm—Lyon & Lyon

[57] ABSTRACT

An apparatus for displaying a travel path of a running body in which a direction detector includes a geomagnetism sensor as well as a rate-type sensor, such as a gyroscope or gas rate sensor (which includes a flow sensor for detecting a degree of displacement of a gas flow produced by an angular velocity applied thereto) for detecting an angular velocity of change of yawing direction of the moving body, in which a difference in angle between directions detected by the rate-type sensor and the geomagnetism sensor is found and temporarily stored when a power source is temporarily turned OFF during operation of the running path displaying apparatus, and then a declination of the direction detected by the geomagnetism sensor is corrected, depending upon the stored difference in angle, when the power source is turned ON again.

1 Claim, 2 Drawing Sheets

APPARATUS FOR DISPLAYING TRAVEL PATH

BACKGROUND OF THE INVENTION

1. Field of the Invention

The present invention relates to a travel path displaying apparatus in which a current location and a path of travel of a running body, such as an automobile, are displayed on a display screen which has a map previously displayed thereon.

2. Description of the Prior Art

In an attempt to prevent a driver of an automobile or the like from losing his way in driving, for example in a strange place, from his desired travel path, there has been developed a travel path displaying apparatus including a distance detector for detecting a distance of travel of a running body and a direction detector for detecting a running direction wherein the current location of the running body on two-dimensional coordinates is successively computed from the respective results of the above-mentioned detections and the location thus computed is displayed on a display screen having a map having azimuthal coordinates corresponding to said two-dimensional coordinates.

In such travel path displaying apparatus, in which the direction detector includes a geomagnetism sensor, a declination $\Delta\theta$, as shown in FIG. 4, is caused between an azimuth detected by the geomagnetism sensor (as indicated by a broken line in FIG. 4) and an azimuth on the map (as indicated by a solid line in FIG. 4), depending upon a particular area. In Japan, the declination $\Delta\theta$ is 6°–10° and in a particular point in the world the declination $\Delta\theta$ may be several tens of degrees. Accordingly, it is necessary to effect a correction of the declination in running direction of the running body detected by the geomagnetism sensor.

Heretofore, it has been a practice to previously determine declination data with respect to a particular map of the relating area which is used to display the travel path, and to effect a arithmetic operation to correct the declination in running direction of the running body, which has been detected by the geomagnetism sensor, by means of a signal processing device.

However, it requires a very troublesome step to previously register declination data with respect to every map of a plurality of areas and to read out the proper declination data concerning a desired area, depending upon the map which is to be used in the display of the travel path.

OBJECT OF THE INVENTION

In view of the disadvantages of the prior art, it is an object of the present invention to provide a travel path displaying apparatus in which a running direction of a running body is detected by means of a geomagnetism sensor, which is capable of correcting declination in running direction of the running body detected by the geomagnetism sensor, without requiring preparation of declination data for each of the maps of the respective areas which are used to display the travel path.

SUMMARY OF THE INVENTION

In order to attain the object as described above, the present invention provides an apparatus for displaying a travel path of a running body in which a direction detector includes a geomagnetism sensor as well as a rate-type sensor, such as a gyroscope or gas rate sensor (which includes a flow sensor for detecting a degree of displacement of a gas flow produced by an angular velocity applied thereto) for detecting an angular velocity of change of yawing direction of the moving body, in which a difference in angle between directions detected by the rate-type sensor and the geomagnetism sensor is found and temporarily stored when the power source is temporarily turned OFF during operation of the running path displaying apparatus, and then the declination of the direction detected by the geomagnetism sensor is corrected, depending upon the stored difference in angle when the power source is turned ON again.

DETAILED DESCRIPTION OF THE PREFERRED EMBODIMENT

Now, the description will be made of a preferred embodiment of the present invention, with reference to the accompanying drawings.

Figure 1:
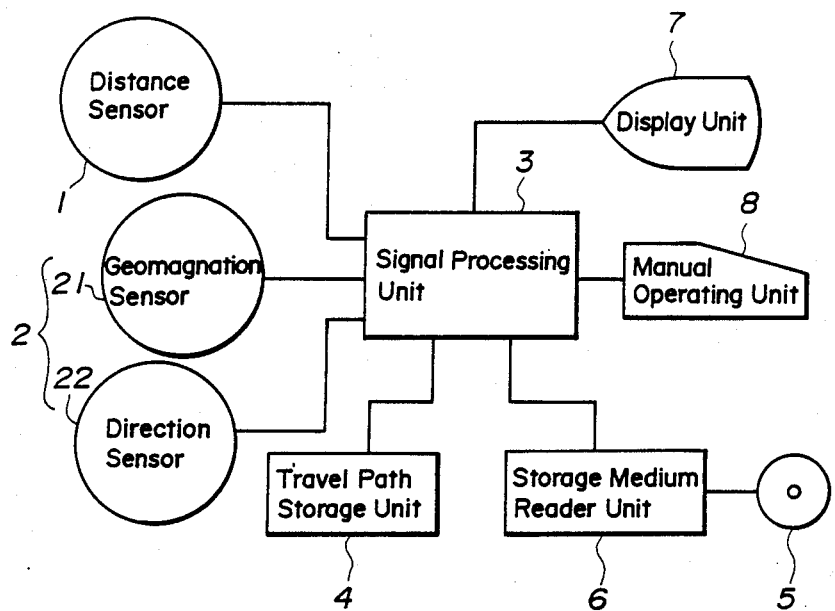
FIG. 1 is a block diagram showing an example of the travel path displaying apparatus according to the present invention.

FIG. 1 shows an example of the fundamental construction of the travel path displaying apparatus according to the present invention. The essential constituent elements include a distance sensor 1 of the photoelectric, electromagnetic, mechanical contact type or the like, for generating pulse signals corresponding to a travel distance of the running body, depending on the rotation of the wheel of said running body, for example, a direction sensor 2 for generating signals proportional to running direction of the running body, a signal processing unit (CPU) 3 which serves to count the number of the pulse signals sent from the distance sensor 1 to measure the distance of travel of the running body and also serves to decide the change of the running direction of the running body on the basis of the output signal of said direction sensor 2 to successively compute the current location of the vehicle on the two-dimensional coordinates at every unit distance of travel of the running body, a travel path storing means (RAM) 4 for successively storing the data of the constantly changing location on the two-dimensional coordinates obtained by said signal processing unit and holding said data as finite and continuous location information corresponding to the current location of the vehicle, a map information storage medium 5 in which a plurality of file units of map information are previously stored, a storage medium reader unit 6 for selectively reading out the desired map file from the storage medium 5, a display unit 7 for displaying a map on a display screen in accordance with the read-out map information and renewedly displaying the current location of the running body, the travel path and the current running direction and the other information on the same display screen on the basis of the location data stored in the storage unit 4, and a manual operating unit 8 for giving a command for operation to the signal processing unit 3 and for affecting various operations including selection of the map to be displayed on the display unit 7, setting of the starting point of the vehicle on the displayed map, change of directions of the displayed map and the travel path, shifting of the displayed position, change of the setting of the displayed form such as the partial enlargement of the display of the map and the travel path, selection of the reduction scale and the like.

Figure 2:
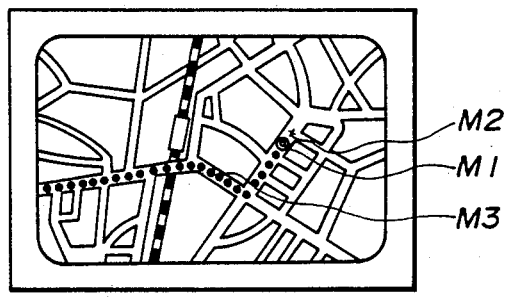
FIG. 2 shows an example of the content of display produced by the travel path displaying apparatus.

In the construction as described above, the map corresponding to an expected running area, which has been accessed and read out from the map information storage medium, is displayed on the display screen of the display unit 7, while the current location on the two-dimensional X-Y coordinates having north and south directions corresponding to those of the map is successively computed, as the running body travels from the starting point set on the map, by means of the signal processing unit 3 on the previously set reductions scale of the map and the result of the computation is successively sent to the travel path storage unit 4 and stored therein, so that the content of the storage is renewed, constantly read out and sent to the display unit 7. As shown in FIG. 2, the display unit 7 has a display mark M1 indicating the current location of the running body on the map corresponding to the expected running area displayed on the display screen, a display mark M2 indicating the running direction of the running body at the current location and displaying mark M3 indicating the travel path from the starting point to the current location. These simulate the running status of the running body.

In accordance with the present invention, the direction detector 2 includes a geomagnetism sensor 21 and a rate-type sensor 22.

The rate-type sensor 22 has a precise direction detecting property in its stationary state, but it involves a problem with respect to its rising property at the time when its power source is turned on, so that it requires a relatively long time until its stable direction detection is started. On the other hand, the geomagnetism sensor 21 can start its stable direction detection at once after its power source is turned on, but it involves a problem with respect to it is susceptible to a disturbance when the moving body is passing through a railroad crossing, an iron bridge or the like so that the detected direction may become incorrect.

In accordance with an embodiment of the present invention, only the advantageous properties of the geomagnetism sensor 21 and the rate-type sensor 22 are utilized. That is, at the time of turning on the power source switch of the travel path displaying apparatus the geomagnetism sensor 21 is used to effect the direction detection, and after a predetermined time sufficient to complete the rising of the rate-type sensor 22 has passed the sensor is changed over from the geomagnetism sensor 21 to the rate-type sensor 22 and the direction detection is effected by the rate-type sensor. Such process is controlled by the signal processing unit 3.

Figure 3:
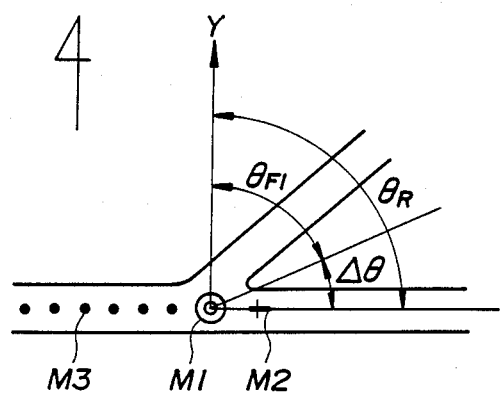
FIG. 3 is a diagram showing the interrlationship between the running direction of the moving body detected by the rate-type sensor and the running direction of the moving body detected by the geomagnetism sensor.
Figure 4:
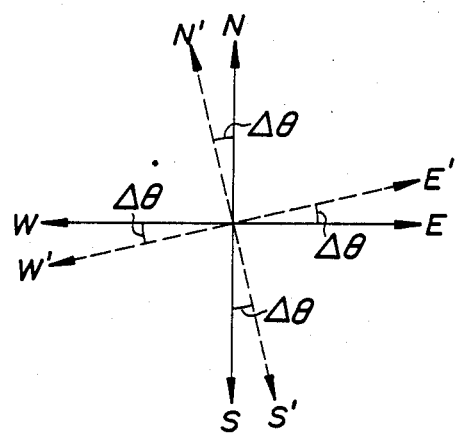
FIG. 4 is a diagram showing interrelation between the azimuth on the map and the azimuth detected by the geomagnetism sensor.

In such travel path displaying apparatus, according to the present invention, when the moving body is temporarily stopped, during driving while displaying the travel path on the display screen, for the purpose of supplying fuel or the like and thus the power source of the travel path displaying apparatus is turned off, the angle $\theta R$ of the running direction of the moving body detected by the rate-type sensor 22 and the angle $\theta F1$ of the running direction detected by the geomagnetism sensor 21 have a difference $\Delta\theta$ in angle, as shown in FIG. 3. This angle diference $\Delta\theta$ is temporarily stored in an inside memory, and when the power source is turned on to restart the moving body, the declination of the angle $\Delta F1$ of the running direction of the moving body detected by the geomagnetism sensor 21 is corrected on the basis of the angle difference $\Delta\theta$ stored in the memory. The corrected running direction $\Delta F2'$ of the moving body is represented by the following formulae.

$$\Delta F2' = \Delta F1 + \Delta\theta \quad (1)$$
$$\Delta\theta = \theta R - \theta F1 \quad (2)$$

At this stage, the angle $\Delta R$ of the runing direction of the runing body detected by the rate type sensor corresponds to the azimuthal coordinates of the map on which the travel path is displayed and at this time the angle difference $\Delta\theta$ relative to the angle $\Delta F1$ of the running direction detected by the geomagnetism sensor 21 corresponds to the declination of the geomagnetism sensor 21.

It will be understood that the present invention provides a travel path displaying apparatus in which at the time when the power source is turned off during driving while displaying the travel path on the display screen, the declination of the running direction detected by the geomagnetism sensor is corrected on the basis of the angle difference relative to the running direction detected by the rate-type sensor. According to this apparatus it is not necessary to previously prepare declination data on each map of the areas in which the travel path displaying apparatus is used and the correction of declination can be easily affected by simple computing process to successively attain the declination data.

We claim:

1. An apparatus for displaying a travel path, direction, and current location of a running body on a X-Y coordinate map with a north direction corresponding to the Y-direction of the X-Y coordinates in which the current location is successively computed from the respective outputs of a distance detector and of a direction detector comprising:

the direction detector including a geomagnetism sensor and a rate-type sensor;

the rate-type sensor detecting angular velocity;

means for finding and storing a difference in angle between a direction detected by the rate-type sensor and a direction detected by the geomagnetism sensor at the time when a power source is turned off during travel path displaying operation; and means for correcting declination of the direction detected by the geomagnetism sensor by adding the stored difference in angle to the direction detected by the geomagnetism sensor at the time when the power source is turned on again, wherein when the power source is turned on said geomagnetism sensor corrected for declination of the detected direction is used exclusively to detect vehicle direction for a predetermined time sufficient for said rate-type sensor to achieve stability in performance, wherein once said stability in performance is achieved, signal processing means causes change over from the geomagnetism sensor to said rate-type sensor for exclusively detecting vehicle direction.

* * * * *